United States Patent [19]
Cangiani et al.

[11] Patent Number: 4,855,932
[45] Date of Patent: Aug. 8, 1989

[54] THREE-DIMENSIONAL ELECTRO-OPTICAL TRACKER

[75] Inventors: Gene L. Cangiani, Parsippany, N.J.; Appasaheb N. Madiwale, Andover, Mass.

[73] Assignee: Lockheed Electronics Company, Plainfield, N.J.

[21] Appl. No.: 71,085

[22] Filed: Jul. 8, 1987

[51] Int. Cl.$^4$ .............................................. G01S 13/00
[52] U.S. Cl. ....................................... 364/516; 342/77
[58] Field of Search ................ 364/516; 235/412–416; 342/179, 180, 52, 66, 75, 77

[56] References Cited

U.S. PATENT DOCUMENTS 4,050,068  9/1977  Berg et al. .............................. 342/53
4,179,696  12/1979  Quesinberry et al. ............... 235/412

OTHER PUBLICATIONS

Maybeck et al, "Adaptive Tracking of Multiple Hot Spot Target IR Images", *IEEE Trans. on Automatic Control*, vol. 28, No. 10, 10/1983, pp. 937–943.

Maybeck et al, "A Target Tracker Using Spatially Distributed Infrared Measurements", *IEEE Trans. on Automatic Control*, vol. AC-25, pp. 222–225, 4/1980.

Maybeck et al, "An Adaptive Kalman Filter for Target Image Tracking", *IEEE Trans. Aerospace and Electronic Systems*, vol. 17, pp. 173–179, 3/1981.

*Primary Examiner*—Thomas H. Tarcza
*Assistant Examiner*—Gregory C. Issing
*Attorney, Agent, or Firm*—Hopgood, Calimafde, Kalil, Blaustein & Judlowe

[57] ABSTRACT

Improved performance in an electro-optical tracker is achieved by incorporating range measurements. Further, the tracker uses a Kalman filter in which the target is modeled as the superposition of two Gaussian ellipsoids in space and projected onto an image plane.

11 Claims, 3 Drawing Sheets

THREE-DIMENSIONAL ELECTRO-OPTICAL TRACKER

BACKGROUND OF THE INVENTION

This invention relates to trackers for weapon systems. More particularly, this invention relates to electro-optical (E/O) trackers.

Electro-optical trackers are useful in pointing weapons incorporated in air defense systems. Typically, these trackers operate on the video output of an electro-optical sensor, such as a visible light camera or a forward-looking infrared sensor, and estimate the location, within the sensor field of view, of the tracked target. Two error signals, proportional to the angular offsets between the target and the sensor line of sight, are provided at the output of the tracker. These error signals may be used in a closed servo loop to drive the sensor pedestal axes so as to keep the sensor pointed at the target.

Most current high-performance trackers utilize a correlation algorithm to perform the tracking function. Correlation algorithms are well suited for high signal-to-noise environments. The signal-to-noise ratio (SNR) may be defined as the peak image intensity divided by the root mean square (rms) background noise level. Trackers using a correlation algorithm suffer significant performance degradation at SNR's of two or below. This performance barrier seriously limits the usefulness of the tracker in adverse weather conditions or under battlefield-induced conditions that include smoke and dust. Additionally, correlation trackers generally cannot "coast" through periods of target obscuration, such as when the target passes behind a cloud, as the tracker will tend to "lock up" on the obscuration. The tracker will also have a tendency to fail if the target flies in front of a highly cluttered background with significant spatial correlation.

An alternative to the correlation tracker has been proposed by Dr. P. S. Maybeck, as described in his recent papers. P. S. Maybeck and D. E. Mercier, "A Target Tracker Using Spatially Distributed Infrared Measurements," *IEEE Transactions on Automatic Control,* Vol. AC-25, pp. 222-225, April, 1980; P. S. Maybeck, R. L. Jensen and D. A. Harnly, "An Adaptive Kalman Filter For Target Image Tracking," *IEEE Transactions on Aerospace and Electronic Systems,* Vol. AES-17, pp. 173-179, March, 1981. Maybeck's tracker employs a Kalman filter instead of a correlation algorithm. Through simulation, Maybeck has achieved a consistent order of magnitude performance improvement over that of existing correlation trackers.

A major shortcoming of the Maybeck tracker arises from the fact that only two-dimensional information is available from the E/O sensor. Due to the motion of the sensor line of sight which occurs when tracking the target, a constant velocity target will have a changing velocity projection in the image plane. Modeling of the motion of the target in two dimensions under such conditions causes artificial dynamics to be introduced into the filter. Further, changes in image size as the target distance varies and changes in the image shape resulting from target aspect angle variation cannot be predicted with a two-dimensional model. Because Maybeck's apparatus is by definition a passive system, it is not possible to incorporate a third dimension.

OBJECTS OF THE INVENTION

It is an object of the invention to develop an electro-optical (E/O) tracker that can perform in low signal-to-noise environments.

It is a further object of the invention to provide an E/O tracker capable of coasting through periods of target obscuration with sufficient reliability to provide a high probability of reacquisition when the target emerges from the obscuration.

It is a further object of the invention to provide an E/O tracker which will provide early maneuver detection of the target via sensitivity to target vehicle attitude changes.

SUMMARY OF THE INVENTION

These objects as well as others not enumerated here are achieved by the invention, one embodiment of which may include a tracker incorporating target range measurement as well as image measurements for processing in a three-dimensional extended Kalman filter. In this tracker, the predicted location of the target image in the sensor field of view is determined based upon the measured angular orientation of the sensor pedestal and the predicted angular position of the target. Subarrays of pixel intensities are averaged to form a two-dimensional array centered at the predicted location of the image centroid. The array element intensities are next ordered into a column vector which is then augmented with the current target range measurement. The resultant column vector is designated the measurement vector and is provided as the input to the three-dimensional extended Kalman filter.

By incorporating the target range measurement and modeling the actual trajectory of the target in space, the artificial dynamics that compromise performance in the two-dimensional formulation of Maybeck are eliminated. The image is modeled as the projection of a three-dimensional model, the superposition of two Gaussian ellipsoids, onto the image plane. Image size changes due to target range changes and image shape changes due to target aspect angle variation are automatically modeled and predicted in the projection equations. Accurate prediction of image size and shape facilitates extraction of the actual target image from a noisy or cluttered background.

This method also permits reliable "coasting" during periods of target obscuration. The proposed algorithm can "coast" much more effectively than the two-dimensional mode because prediction is along the estimated trajectory in three-dimensional space. Additionally, unmodeled image shape changes due to target attitude changes, as when the target rolls to begin a turn, can be used to detect the onset of target maneuvers earlier than can be done with conventional fire control systems. In the two-dimensional formulation, this cannot be accomplished, since unmodeled image shape changes are constantly occurring as the target aspect angle changes.

BRIEF DESCRIPTION OF THE DRAWINGS

A more complete understanding of the present invention, as well as other objects and advantages thereof not enumerated, will become apparent upon consideration of the following detailed description, especially when considered in light of the accompanying drawings wherein.

DETAILED DESCRIPTION OF THE INVENTION

The operation of the invention may be best explained by reference to FIG. 1, which is a block diagram of the sensors and the three-dimensional E/O tracker algorithm. An E/O sensor and digitizer 10 provides the raw image data to a preprocessor 12, a selected portion of which is processed by a Kalman filter 14. The E/O sensor 10 has a field of view which is typically divided into a 512×512 array of pixels and its output is provided to the preprocessor 12 in this form. Depending on the range of the target with respect to the sensor, the target image will occupy anywhere from a few to all of the pixels.

To allow sufficient resolution while holding the number of calculations to a practical limit, an array of 8×8 is chosen as the tracking gate, which is the name given to the "window" of the filter 14. This size adaptation is achieved by letting each element of the 8×8 array consist variously of one physical pixel, the average intensity of a 2×2 array of physical pixels, or the average intensity of a 3×3 array, and so on. The size of the tracking gate is controlled therefore by the predicted size of the image and is kept sufficiently large to encompass the useful portion of the image while preserving adequate resolution.

Figure 2:
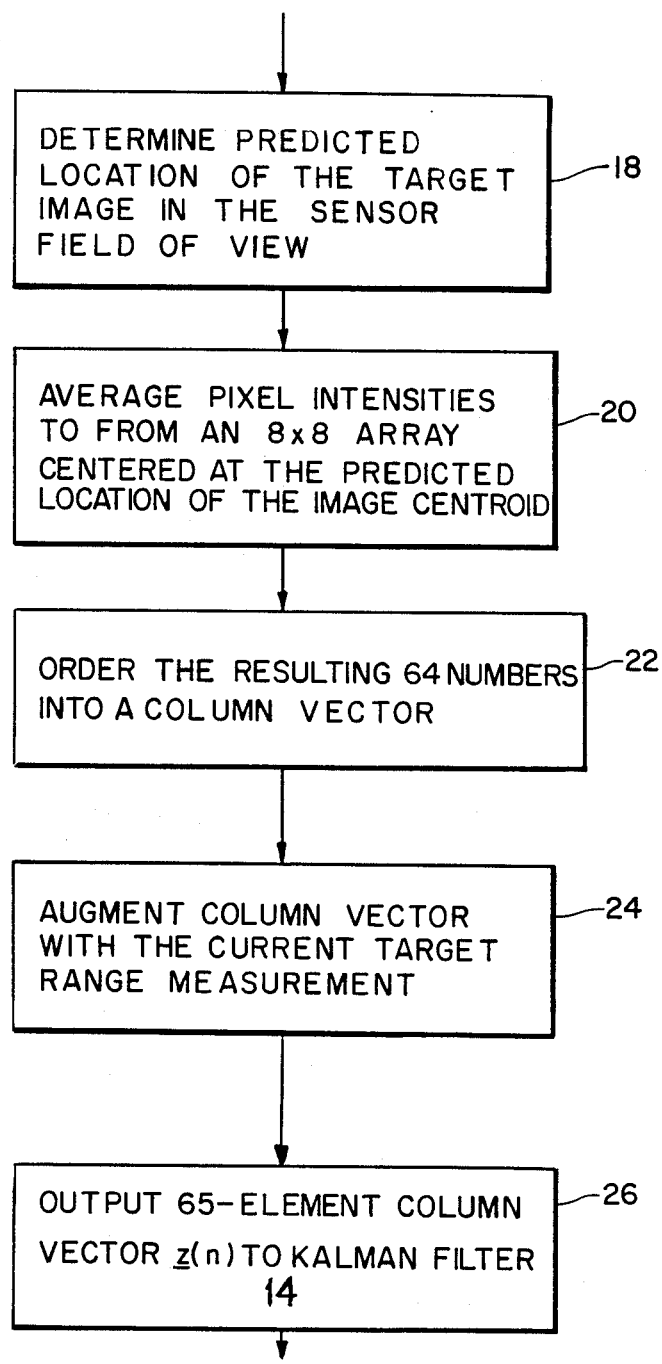
FIG. 2 is a flow chart of the tracker sensing process.

In addition to the input from the E/O sensor 10, a range sensor 16 provides a range measurement R to the preprocessor 12. The functions performed in the preprocessor 12 are illustrated in flow chart form in FIG. 2. Each step of the flow chart is designated by a reference numeral in parentheses. First, the expected location of the target image in the sensor field of view is determined based upon the measured angular orientation of the sensor pedestal and the predicted angular position of the target (18). Then, the pixel intensities are averaged to form an 8×8 array centered at the predicted location of the image centroid (20). The individual elements of the array are then ordered into a column vector (22). Next, the column vector is augmented with the current target range measurement (24). The resultant is a measurement vector designated z(n), which is present at the output of the preprocessor. This result is then processed by the extended Kalman filter 14, which is connected to the output 26 of the preprocessor 12 (28).

As explained above, the preprocessor 12 averages and orders the image data for the Kalman filter 14. However, there are situations where the image data is unaltered by the preprocessor 12. For example, where the entire image can be encompassed in the 8×8 window, no averaging occurs. The image data is not modified and the preprocessor 12 is in reality a pass-through. Therefore, the Kalman filter 14 in essence receives inputs directly from the electro-optical sensor 10 and the range sensor 16.

Figure 1:
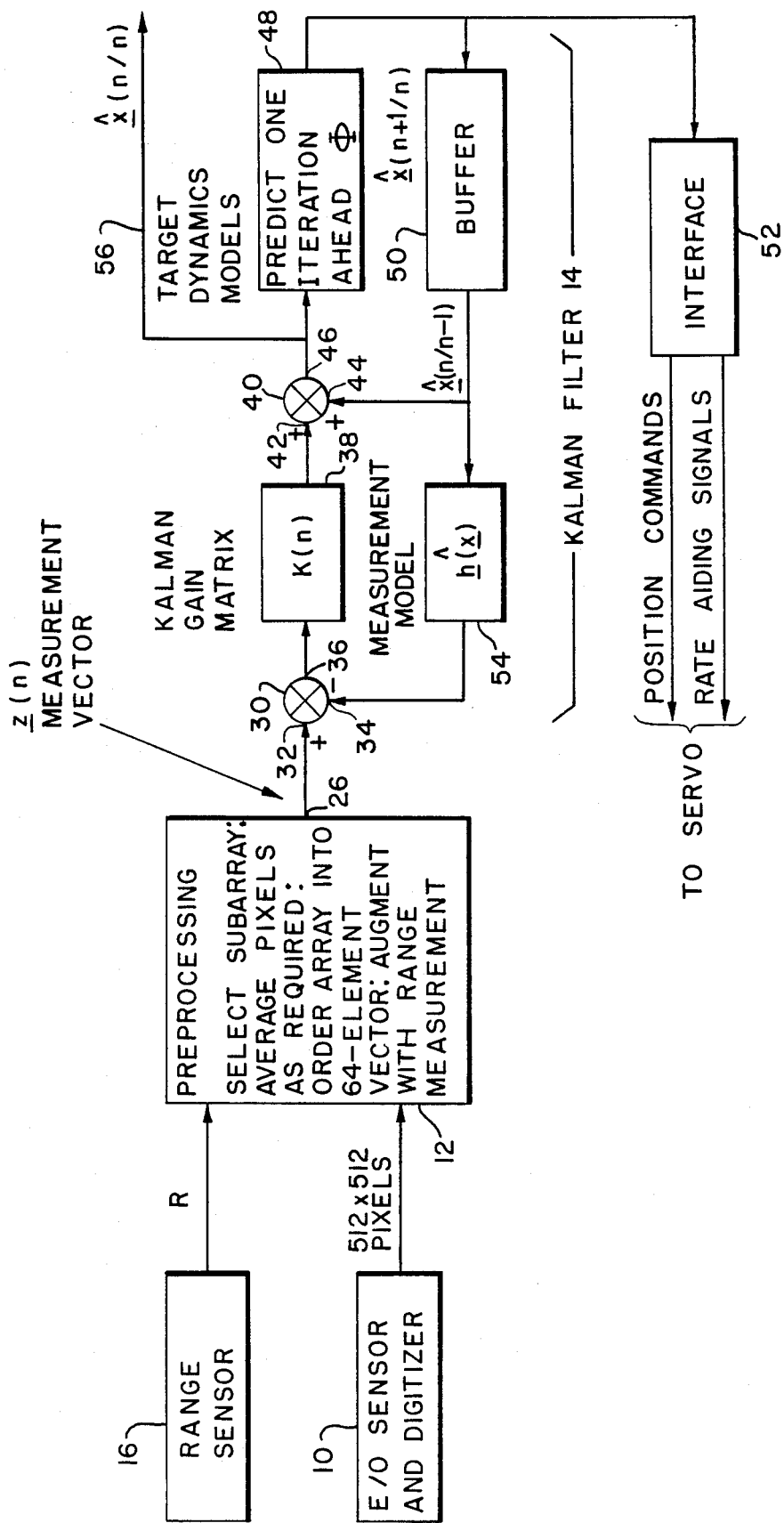
FIG. 1 is a block diagram of the sensors and the tracker algorithm according to the invention.

As illustrated in FIG. 1, the first stage in the extended Kalman filter 14 is a first adder 30 having a non-inverting input 32 connected to the output 26 of the preprocessor 12, an inverting input 34, and an output 36. A Kalman gain matrix 38 is located between the output 34 of the adder 30 and a second adder 40 at its first non-inverting input. The second adder 40 has another non-inverting input 44 and an output 46.

The output 46 of the second adder 40, the present state vector approximation, which is designated as $\underline{x}$, is provided to the dynamics model 48. The dynamics model 48 generates the next estimate of the state vector $\underline{x}$, and its output is provided to a storage or buffer module 50. The buffer module 50 retains the value of the state estimate for the next iteration of the Kalman filter 14. Additionally, the output of the dynamics model is connected to an interface 52 which provides rate aiding signals and position commands to the servos (not shown) controlling the pedestal which supports the E/O sensor 10. The output of the buffer module 50 is connected to the second non-inverting input 44 of the second adder 40 and the input of a measurement model 54. Finally, the output of the measurement model 54 is provided to the inverting input 34 of the first adder 30, closing the loop.

The output of the 56 of the Kalman filter 14 is taken from the output 46 of the second adder 40. The signal at that point is designated $\hat{x}(n/n)$. The carat indicates that this quantity is an estimate and the n/n indicates that the estimate is at time nT, given n measurements, where T is the time interval between iterations. The target dynamics model 40, using standard, well-known Kalman techniques, computes the predicted state estimate for time (n+1)T, which is designated $\hat{x}(n+1/n)$. The measurement model 54 processes the predicted state vector estimate from the result of the previous iteration, $\hat{x}(n/n-1)$, which was stored in the buffer 50, generating $\underline{h}(\hat{x}(n/n-1))$, the estimate of the current measurement. This is subtracted from the measurement vector $\underline{z}(n)$ in the first adder 30, yielding the residual or innovations process, $\underline{z}(n)-h(\hat{x}n/n-1)$). The residual is then multiplied by the Kalman gain matrix, K(n), and the result is used to update the state vector estimate, $\hat{x}(n)$.

In order to fully appreciate the invention, the Kalman filter 14 will now be examined in greater detail. The purpose of the filter 14 is to provide an estimate of the position, velocity, and acceleration of the target vehicle. These quantities are represented by the state vector, referred to previously as $\underline{x}(n)$ and shown in expanded form as $\underline{x}$.

$$x = [x\ y\ z\ \dot{x}\ \dot{y}\ \dot{z}\ \ddot{x}\ \ddot{y}\ \ddot{z}] \qquad \text{Eq. 1}$$

In each iteration, the state vector $\underline{x}$ is updated to an approximation of the actual position, velocity, and acceleration of the target.

The present estimate $\hat{x}(n/n)$ is first provided to the target dynamics model 48 to generate the next estimate, $\underline{x}(n+1/n)$. The next estimate $\hat{x}(n+1/n)$ is generated by the target dynamics model 48, by multiplying the state vector by the state transition matrix $\phi$.

$$x(n+1/n) = \Phi x(n/n) \qquad \text{Eq. 2}$$

The state transition matrix that is used in any embodiment of this invention is dependent on the particular dynamics model chosen for that application. The result, $\hat{x}(n+1/n)$, is stored in the buffer 50.

At the next iteration, the buffer 50 releases the state vector estimate, which is used for two purposes. It is provided to the measurement model 54 to generate a new measurement estimate and to the second adder 40 to form the basis for the "new" present state vector estimate, $\hat{x}(n/n)$, when combined with the product of the residuals and the Kalman gain matrix.

The measurement model 54 differs from Maybeck's image model in that the latter relies upon a two-dimensional representation of the target image whereas the former is modeled as the projection of a three-dimensional body onto the image plane. Maybeck's image model is a Gaussian ellipse, which does not offer the capability of prediction of changes in image size and shape as the target range and aspect angle change, respectively.

Here, the model is the superposition of two Gaussian ellipsoids, one (aligned with the velocity vector) representing the fuselage and the other representing the wing surfaces. The Gaussian ellipsoids are three-dimensional density functions, fixed for a specific target. During an engagement, only the image size and shape change, due to variation in range and aspect angle, and these changes are automatically accounted for in the projection equations.

Since the specific aircraft to be tracked is not known beforehand, the tracker begins with a generalized configuration using nominal values. During engagement, the image model parameters will adapt to the actual target size and shape.

The foregoing dual Gaussian ellipsoid representation forms the basis for the measurement model. Broadly stated, the measurement model is an algorithm for projecting the expected intensity distribution pattern of the target in the image plane as a function of the state vector estimate. It is derived by starting with intensity functions for the ellipsoids. The fuselage is represented by the following equation.

$$I_{3f} = \frac{I_{max}}{2} \exp\left\{ \frac{-1}{2} \left( \frac{x_{a1}^2}{f_1^2} + \frac{x_{a2}^2}{f_2^2} + \frac{x_{a3}^2}{f_3^2} \right) \right\}. \quad \text{Eq. 3}$$

The wingspan surface is represented by a similar equation.

$$I_{3w} = \frac{I_{max}}{2} \exp\left\{ \frac{-1}{2} \left( \frac{x_{a1}^2}{w_1^2} + \frac{x_{a2}^2}{w_2^2} + \frac{x_{a3}^2}{w_3^2} \right) \right\}. \quad \text{Eq. 4}$$

Compare Eq. 1 of Maybeck, 1980. The parameters $f_1$, $f_2$, $f_3$, $w_1$, $w_2$, and $w_3$ are proportional to the actual aircraft dimensions. For ease of handling, the foregoing expressions are converted into vector matrix form.

$$I_{3f} = \frac{I_{max}}{2} \exp\left\{ \frac{-1}{2} x_a' W_f^{-1} x_a \right\}, \quad \text{Eq. 5}$$

$$I_{3w} = \frac{I_{max}}{2} \exp\left\{ \frac{-1}{2} x_a' W_w^{-1} x_a \right\} \quad \text{Eq. 6}$$

where:

$$x_a = \begin{bmatrix} x_{a1} \\ x_{a2} \\ x_{a3} \end{bmatrix};$$

and $$W_f = \begin{bmatrix} f_h^2 & 0 & 0 \\ 0 & f_l^2 & 0 \\ 0 & 0 & f_h^2 \end{bmatrix}; \quad W_w = \begin{bmatrix} w_l^2 & 0 & 0 \\ 0 & w_w^2 & 0 \\ 0 & 0 & w_h^2 \end{bmatrix}$$

$x_a$ is a rectangular coordinate system that is aligned with the target aircraft body. Equations 5 and 6, which represent the three-dimensional models for the fuselage and wingspan, are superposed and projected onto the image plane as follows:

$$I_t = \frac{I_{max}}{2} \left[ \exp\left\{ \frac{-1}{2} p_1'(T W_f T)^{-1} p_1 \right\} + \right.$$

$$\left. \exp\left\{ \frac{-1}{2} p_1'(T W_w T)^{-1} p_1 \right\} \right] \quad \text{Eq. 7}$$

where:

$$p_1 = \begin{bmatrix} x_{11} \\ x_{13} \end{bmatrix}$$

Imax is the peak image intensity. $p_1$ is a two-dimensional coordinate system parallel to the image plane, but located at the target. T' is a 2×3 coordinate rotation matrix that transforms aircraft body coordinates to image plane coordinates. Under the assumption that the velocity vector is along the fuselage, T' can readily be derived from the state vector estimate. The prime notation indicates a matrix transpose; the superscript $-1$ indicates a matrix inverse.

Figure 3:
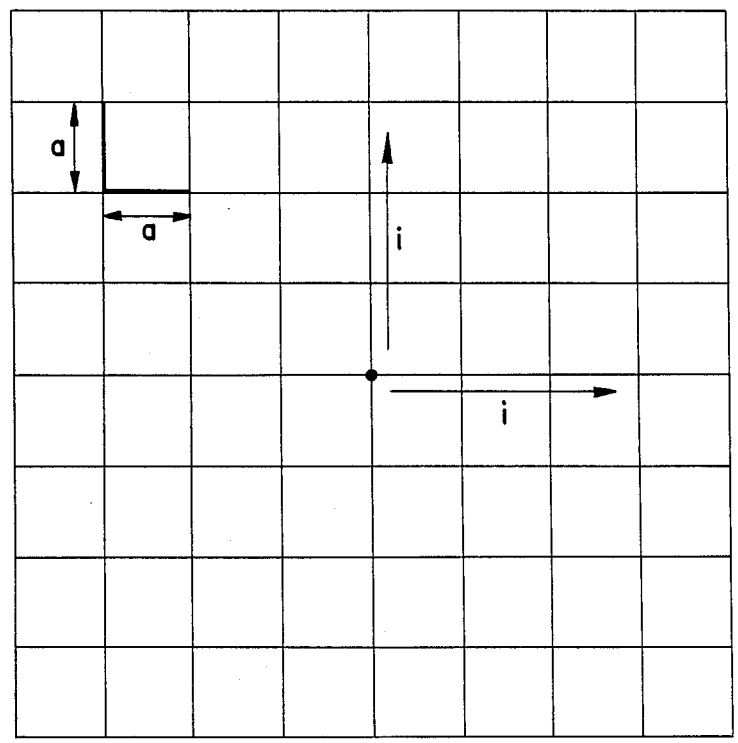
FIG. 3 is a graph illustrating the array element configuration.

The image must now be scaled to obtain a useful image intensity distribution at the sensor location. The sensor provides measurements of the average intensity level over the area subtended by each physical pixel. As described previously, an array element in this application is not necessarily one physical pixel, but may be the average of a subarray of several pixels. In any case, the intensity corresponding to an array element will be approximated by the value of the intensity function at the center of the array element. Each array element is assumed to be a square with angular dimension a on each side. To simplify the resulting expressions, array elements are numbered from the center of the array, as shown in FIG. 3.

For all cases of interest herein, the following small angle approximations can be used:

$$x_{11} = Rak; \quad x_{13} = Ral \quad \text{Eqs. 8, 9}$$

where $$R = \text{target range} = \sqrt{x_{01}^2 + x_{02}^2 + x_{03}^2}$$

and $$k = i - \frac{.5i}{|i|}; \quad l = j - \frac{.5j}{|j|}.$$

The indices i and j, as illustrated in FIG. 3, specify a particular array element, and each can have any of eight values (−4, −3, −2, −1, 1, 2, 3, 4). The indices k and l include the required offsets to obtain the value at the center of the specified array element.

If we let:

$$s = \begin{bmatrix} k \\ l \end{bmatrix} \quad \text{Eq. 10}$$

the desired expression for the intensity distribution in the image plane can then be written as:

$$I = \frac{I_{max}}{2}\left[\exp\left\{\frac{-R^2a^2}{2}s'(TW_fT)^{-1}s\right\} + \exp\left\{\frac{-R^2a^2}{2}s'(TW_wT)^{-1}S\right\}\right]. \quad \text{Eq. 11}$$

Note that this model includes automatic scaling of the image size as target range varies.

Using the last expression, the measurement model will yield the predicted intensity for each pixel being provided by the preprocessor 12. Also, since this is an extended Kalman filter formulation, the derivative of the measurement model with respect to the state vector estimate must also be generated for use in the covariance update and Kalman gain calculations. This can be readily derived using Eq. 11. The difference between the two inputs is the residual, which is multiplied by the Kalman gain matrix K(n) using well-known techniques. (See Maybeck, 1980, p. 224, Eq. 14.). The result of multiplying the residuals by the Kalman gain matrix in block 38 is the state vector update which is summed with the predicted state vector estimate $\hat{x}(n/n-1)$ to form the present state vector estimate $\hat{x}(n/n)$.

In a variation of the invention, the Kalman filter could be modified to include a parameter estimation stage connected between the output of the first adder 30 and the measurement model 54. The parameter estimation stage would modify the model to reflect the actual target more precisely. This can be achieved with a recursive gradient technique similar to that in Maybeck, 1981.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed:

1. An electro-optical tracker for tracking a target moving in three-dimensional space, comprising:
   a servo-controlled electro-optical sensor having an image data output;
   a range sensor for detecting the distance between the sensor and the target, the range sensor having an output;
   preprocessing means responsive to the output of the electro-optical sensor and the range sensor, the preprocessing means having an output; and
   Kalman filter means for generating a predicted position, velocity, and acceleration of the target, the Kalman filter means being connected to the output of the preprocessing means and including an interface for controlling the servos of the electro-optical sensor; the Kalman filter means including
   prediction means for generating a predicted position, velocity, and acceleration of the target; and
   modeling means for generating a predicted two-dimensional image from a projection of the target in space, where the target is represented in the filter by a three-dimensional object.

2. An electro-optical tracker as set forth in claim 1 above wherein the three-dimensional object is the product of the superposition of a first three-dimensional object on a second three-dimensional object.

3. An electro-optical tracker as set forth in claim 2 wherein the first three-dimensional object is representative of the fuselage of the target and the second three-dimensional object is representative of the wingspan surfaces of the target.

4. An electro-optical tracker as set forth in claim 3 wherein the first and second three-dimensional objects are Gaussian ellipsoids.

5. A method of controlling a three-dimensional electro-optical tracker, having an electro-optical sensor having an image data output, following a target moving in three-dimensional space, comprising the steps of:
   capturing the target in the field of view of the electro-optical sensor;
   measuring the range of the target from the sensor;
   selecting a portion of the output of the electro-optical sensor;
   augmenting the selected portions with the range measurement to form an augmented partial target image;
   developing predicted values for the augmented partial target image by modeling the target as a three-dimensional object in space, the model being a function of the iterated predictions of position, velocity, and acceleration;
   substracting the predicted values from the augmented partial target image to yield a residual difference;
   multiplying the residual difference by a Kalman gain factor to produce an update; and
   summing the update and the predicted value of position, velocity, and acceleration.

6. The method as set forth in claim 5, wherein the target is modeled as one three-dimensional object superposed on another three-dimensional object.

7. The method as set forth in claim 5, wherein the target is modeled as a first three-dimensional Gaussian ellipsoid superposed on a second three-dimensional Gaussian ellipsoid.

8. An electro-optical tracker for tracking a target moving in three-dimensional space, comprising:
   a servo-controlled electro-optical sensor having an image data output;
   a range sensor for detecting the distance between the sensor and the target, the range sensor having an output;
   Kalman filter means for generating a predicted position, velocity, and acceleration of the target, the Kalman filter means being connected to and operating upon at least a portion of the outputs of the electro-optical sensor and the range sensor and including an interface for controlling the servos of the electro-optical sensor; the Kalman filter means including
   prediction means for generating a predicted position, velocity, and acceleration of the target; and
   modeling means for generating a predicted two-dimensional image from a projection of the target in space, where the target is represented in the filter by a three-dimensional object.

9. An electro-optical tracker as set forth in claim 8 above wherein the three-dimensional object is the product of the superposition of a first three-dimensional object on a second three-dimensional object.

10. An electro-optical tracker as set forth in claim 9 wherein the first three-dimensional object is representative of the fuselage of the target and the second three-dimensional object is representative of the wingspan surfaces of the target.

11. An electro-optical tracker as set forth in claim 10 wherein the first and second three-dimensional objects are Gaussian ellipsoids.

* * * * *